(12) United States Patent
Lee

(10) Patent No.: US 11,954,869 B2
(45) Date of Patent: Apr. 9, 2024

(54) MOTION RECOGNITION-BASED INTERACTION METHOD AND RECORDING MEDIUM

(71) Applicant: IPIXEL CO., LTD., Seoul (KR)

(72) Inventor: Sang Soo Lee, Seoul (KR)

(73) Assignee: Ipixel Co., Ltd., Seoul (KR)

( * ) Notice: Subject to any disclaimer, the term of this patent is extended or adjusted under 35 U.S.C. 154(b) by 0 days.

(21) Appl. No.: 18/354,783

(22) Filed: Jul. 19, 2023

(65) Prior Publication Data

US 2023/0368401 A1 Nov. 16, 2023

Related U.S. Application Data

(63) Continuation of application No. PCT/KR2021/016117, filed on Nov. 8, 2021.

(30) Foreign Application Priority Data

Oct. 26, 2021 (KR) ........................ 10-2021-0143773

(51) Int. Cl.
*G06T 7/246* (2017.01)
*G06V 20/40* (2022.01)
*G06V 40/20* (2022.01)

(52) U.S. Cl.
CPC .............. *G06T 7/248* (2017.01); *G06V 20/46* (2022.01); *G06V 40/20* (2022.01)

(58) Field of Classification Search
CPC ......... G06T 7/248; G06V 20/46; G06V 40/20
See application file for complete search history.

(56) References Cited

U.S. PATENT DOCUMENTS

| | | | | |
|---|---|---|---|---|
| 10,107,627 | B2* | 10/2018 | Aboutalib | G01C 21/1654 |
| 2016/0216770 | A1* | 7/2016 | Jang | G06F 3/017 |
| 2017/0351910 | A1* | 12/2017 | Elwazer | G06V 10/768 |
| 2018/0154215 | A1 | 6/2018 | Ryu et al. | |

(Continued)

FOREIGN PATENT DOCUMENTS

| KR | 20180026066 A | 3/2018 |
|---|---|---|
| KR | 101864987 B1 | 6/2018 |

(Continued)

OTHER PUBLICATIONS

Thar, Maybel Chan, et al., "A Proposal of Yoga Pose Assessment Method Using Pose Detection for Self-Learning", University of Information Technology, Yangon, Myanmar, Okayama University, Okayama, Japan, Downloaded Jun. 30, 2023, 6 pages.

(Continued)

*Primary Examiner* — Pinalben Patel
(74) *Attorney, Agent, or Firm* — Guntin & Gust, PLC; Miyoung Shin

(57) ABSTRACT

A motion recognition-based interaction method includes the steps of: providing a first motion image as a reference to a user terminal, obtaining a second motion image of the motion of a user from the user terminal, extracting a reference motion from the first motion image, extracting the user motion from the second motion image, and evaluating the motion state of the user by comparing the reference motion with the user motion, and providing feedback to the user based on the evaluation of the motion state. The feedback includes visual feedback.

15 Claims, 8 Drawing Sheets

(56) References Cited

U.S. PATENT DOCUMENTS

2018/0259341 A1* 9/2018 Aboutalib .......... G01C 21/1654
2020/0335007 A1* 10/2020 Kim ..................... G06V 10/40

FOREIGN PATENT DOCUMENTS

| KR | 20190113265 A | 10/2019 |
| KR | 20200129327 A | 11/2020 |

OTHER PUBLICATIONS

Notice of Preliminary Examination Report for Counterpart Korean Patent Application No. 10-2021-0143773 dated Dec. 15, 2021 and English translation (13 pages).
International Search Report of PCT/KR2021/016117 dated Jul. 22, 2022 (5 pages).

* cited by examiner

I

II

MOTION RECOGNITION-BASED INTERACTION METHOD AND RECORDING MEDIUM

CROSS-REFERENCE TO RELATED APPLICATION(S)

The present application is a continuation of and claims the benefit of priority to PCT Patent Application No. PCT/KR2021/016117 filed Nov. 8, 2021, which claims priority to Korean Patent Application Serial No. 10-2021-0143773 filed on Oct. 26, 2021, which is hereby incorporated herein by reference in its entirety.

FIELD OF THE DISCLOSURE

The present disclosure relates to a motion recognition-based interaction method and a recording medium.

BACKGROUND

Currently, home training services performed online are unilateral and unidirectional like broadcasting. For example, in the case of the burpee test, a demonstrator shows movements first and waits for users to follow the movements for a given period of time. When the given period of time has elapsed, the exercise is considered as being completed and the next movements proceed.

In this way, generally, a user follows the demonstrator's movements while watching a demonstrator's lecture video over the Internet, but there is no way to objectively determine whether a student actually follows the movements accurately and actually performs a target exercise quantity.

In order to solve the above problem, a function for a demonstrator to check a user's training video captured through the user's webcam or smartphone may be added. However, in this case, a problem of personal privacy may occur, and there is a limit in efficiently monitoring multiple users at the same time and providing real-time feedback by one demonstrator.

Therefore, there is a need for a service that can accurately digitize a training situation of a user receiving home training online while taking advantage of home training to adjust intensity or design an exercise plan according to an individual's exercise quantity.

BRIEF DESCRIPTION OF THE DRAWINGS

FIG. 5A depicts one exemplary user image and FIG. 5B depicts another exemplary user image.

SUMMARY

Figure 1:
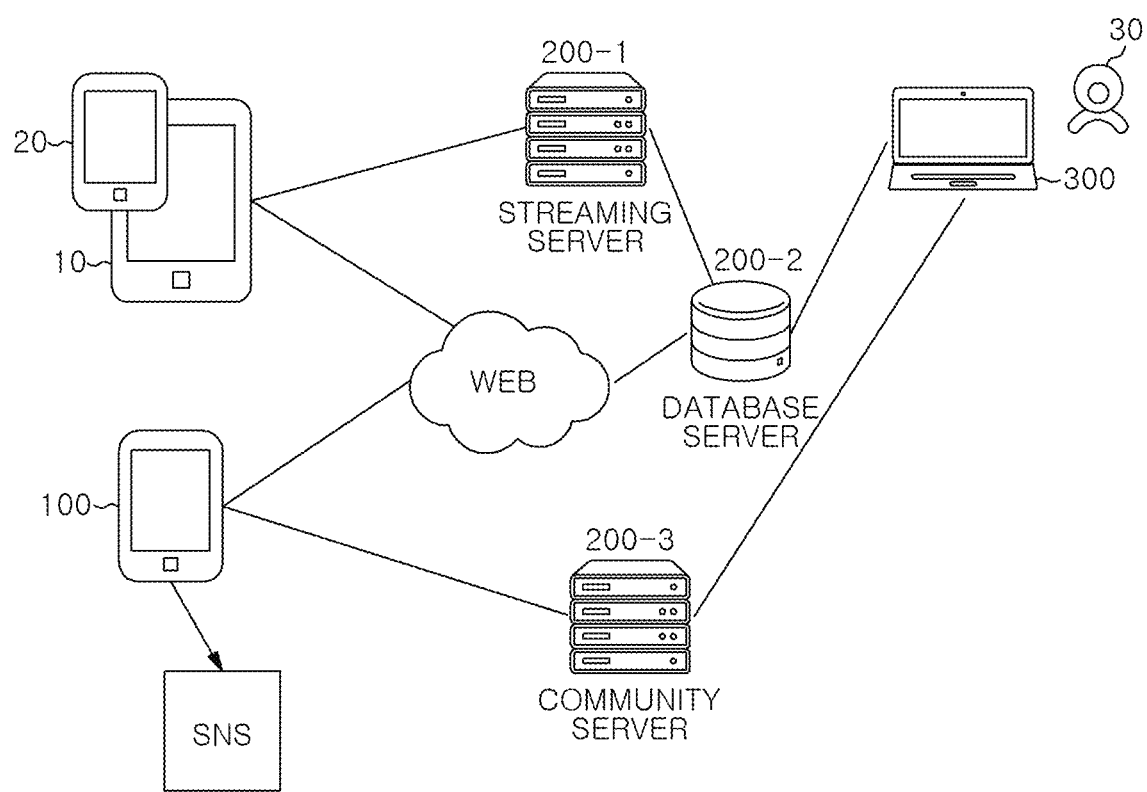
FIG. 1 is a diagram illustrating a basic configuration of a motion recognition-based interaction system according to an embodiment of the present disclosure.

The present disclosure is directed to providing a motion recognition-based interaction method and a recording medium.

The present disclosure is also directed to providing a method of providing visual feedback to a user on the basis of motion state evaluation so that the user can determine his/her own motion state in real time and transmit a message through motion recognition, and a recording medium.

Objects according to the technical spirit of the present disclosure are not limited to the above-described objects and other objects that are not described may be clearly understood by those skilled in the art to which the embodiments proposed by the following descriptions belong.

One aspect of the present disclosure provides a motion recognition-based interaction method which includes providing a first motion image as a reference to a user terminal, obtaining a second motion image of a motion of a user from the user terminal, extracting a reference movement from the first motion image, extracting a user movement from the second motion image, and evaluating a motion state of the user by comparing the reference movement with the user movement, and providing feedback to the user on the basis of the evaluation of the motion state, wherein the feedback includes visual feedback.

In at least one variant, the providing of the first motion image to the user terminal may include grouping a plurality of users into one or more groups to provide the image thereto and receiving image reception delay information received by the user terminal to synchronize image synchronization in real time.

In another variant, the providing of the first motion image to the user terminal may include providing a pre-stored image or providing a real-time streaming video.

In another variant, a movement vector of a subject of the reference movement may be corrected by comparing relative coordinates of the subject of the reference movement with relative coordinates of a subject of the user movement so that an error caused by a difference in physical size between the subject of the reference movement and the subject of the user movement may be corrected, and motion accuracy may be determined by comparing the corrected movement vector of the subject of the reference movement with a movement vector of the subject of the user movement.

In another variant, the evaluating of the motion state of the user may be performed by deep learning training.

In another variant, the deep learning training may be performed by pose estimation technology, and each of the reference movement and the user movement may be calculated to correspond to relative coordinates between a specific body reference point of each of the subject of the reference movement or the subject of the user movement and an individual skeleton and to a movement of the skeleton with respect to the relative coordinates.

In another variant, the motion state of the user may be about motion accuracy indicating a degree of matching between the reference movement and the user movement.

In another variant, when the motion accuracy deviates from a critical range, information about a skeleton and a joint performing the motion deviating from the critical range may be provided.

In another variant, the evaluating of the motion state of the user may include assigning a score by quantifying similarity on the basis of the motion accuracy, or assigning a score on the basis of expected calorie consumption.

In another variant, the expected calorie consumption may be estimated based on weight information, exercise time, and motion accuracy-based similarity information that are collected about the user.

In another variant, when an application for providing a motion recognition-based interaction service is executed in the user terminal, the user terminal may switch a control method of the application to a motion recognition-based control method.

In another variant, when a specific motion of the user is recognized, preset message information may be transmitted.

In another variant, when a specific motion of the user is recognized, the execution of the application may be terminated.

In another variant, the providing of the feedback to the user may include generating real-time feedback information on the basis of the second motion image obtained in real time and transmitting the generated real-time feedback information to the user terminal.

In another variant, the providing of the feedback to the user may include providing a visual effect that dynamically interacts with the user on the basis of quantified user motion evaluation results.

In another variant, the evaluating of the motion state of the user by comparing the reference movement with the user movement may include assigning a score quantified according to similarity of the motion state of the user for each major joint on the basis of the reference movement, and the providing of the visual effect that dynamically interacts with the user may include providing a visual effect that is allowed to track the user movement in the second motion image in real time and indicate the motion state according to the score for each major joint.

Another aspect of the present disclosure provides a non-transitory computer-readable recording medium on which a program for implementing the above-described method.

According to embodiments of the present disclosure, it is possible to provide a method of providing visual feedback to a user on the basis of evaluation of a motion state so that a user can determine his/her own motion state in real time and transmit a message through motion recognition, and a recording medium.

DETAILED DESCRIPTION

Hereinafter, specific embodiments of the present disclosure will be described in detail with reference to the accompanying drawings. However, the technical spirit of the present disclosure is not limited to embodiments described below, and other degenerative disclosures or other embodiments included in the scope of the technical spirit of the present disclosure may be easily suggested by adding, changing, and deleting other elements.

The terms used herein are selected from among general terms that are currently and widely used in relation to the present technology as much as possible, and in special cases, some terms may be arbitrary selected by applicants. In this case, meanings thereof will be described in detail in a corresponding description of embodiments of the present disclosure. Therefore, the present disclosure should be understood with the meaning of the terms rather than simply the terms themselves. In the description given below, the words "comprising" and "including" do not exclude the presence of elements or operations other than those listed.

The motion recognition-based interaction system according to the embodiment of the present disclosure may provide individual motion training between a user corresponding to an individual student and a demonstrator using deep learning training.

The individual motion training may be provided in a 1:1 customized manner. Specifically, the individual motion training may be performed by matching the user with a specific demonstrator selected by the user. In some embodiments, the individual motion training may be performed in a 1:N customized manner by matching the user with a plurality of demonstrators.

The individual motion training may be provided through an application (hereinafter, referred to as an "app") executable on a user terminal or a web-based service. As a result, the user may perform customized fitness training by the demonstrator even in a remote place (e.g., home, office, etc.) other than a gym. In the present disclosure, the customized fitness training may include examples of various motion-based exercises and movements, such as golf, dance, gymnastics, and the like as well as personal training such as fitness training or the like, but the present disclosure is not limited thereto.

In various embodiments, a deep learning training model may include pose estimation. Pose estimation is an open source and may be image processing technology in which a human motion or posture is recognized using deep learning. A pose estimation training model may be loaded in the form of a library in a user terminal 100 and/or a server 200 to find joint parts (key points) from an image of a person and extract motions of the skeleton and joints of the human body as digital data. In this case, the pose estimation training model may determine the person's motion (e.g., push-up, squat, etc.) from the extracted digital data.

In some embodiments, a motion or posture of the user may be recognized using an algorithm or artificial intelligence other than pose estimation.

The motion recognition-based interaction system according to the present embodiment may include a user terminal 100, a server 200, and a demonstrator terminal 300.

The user terminal 100 may obtain a real-time image of the user. For example, a smartphone possessed by the user or a personal computer (PC) provided on the user side may obtain an image of a motion of the user through a built-in camera. In this case, the user terminal 100 may capture an image of the user while maintaining a predetermined distance from the user so that an entire motion of the user comes within a viewing angle of the camera.

In this way, due to the characteristics of the service in which the distance between the user terminal 100 and the user should be secured, a method of controlling the user terminal 100 by a touch method when receiving the service causes inconvenience. In order to solve the above problem, the user terminal 100 may be controlled from a long distance (e.g., within 3 m) by a motion recognition command of the user.

The user terminal 100 may operate in an extended view mode. In this case, the user terminal 100 may transmit the image displayed on the corresponding user terminal 100 to a nearby large display device (e.g., a smart television (TV), a tablet PC, a PC monitor, etc.) or perform mirroring with the large display device. In this case, the large display device may operate as an extended viewer that displays the image displayed on the user terminal 100 on a large screen. Referring to FIG. 1, the image displayed on the user terminal 100 is displayed on a smart TV 10 or tablet PC 20 having a large screen.

The server 200 may perform a back-end function for performing a process for providing the motion recognition-based interaction service. To this end, the server 200 may include a streaming server 200-1, a database server 200-2, a community server 200-3, and the like. The streaming server 200-1 may perform video lecture and training service provision and web service-based member management. The database server 200-2 may perform data generation and storage, statistics calculation, and the like. Further, the database server 200-2 may perform a function of an encryption system that manages and secures a customer's biometric database. The community server 200-3 may support Internet broadcasting and chatting for communication between the demonstrator and the user.

Further, the server 200 may execute tools for administrators or provide the tools for administrators to the user terminal 100 and the demonstrator terminal 300. Here, the tools for administrators may include a lecture video editing tool and a tool for extracting pose data from a lecture video of a demonstrator, a user training data monitoring and statistical data inquiry tool, and the like.

The demonstrator terminal 300 may provide a first motion image of the demonstrator. In some embodiments, the first motion image may be provided in real time or in the form of a pre-fabricated image.

The first motion image may be captured by a webcam 30 connected to the demonstrator terminal 300 or a built-in camera, and then transmitted to the user terminal 100 or the server 200. In this case, the demonstrator may capture the first motion image while maintaining a predetermined distance from the demonstrator terminal 300 or the webcam 30 so that an entire motion of the demonstrator comes within a viewing angle of the webcam 30 or camera. For convenience of the demonstrator's control, the demonstrator terminal 300 and the webcam 30 may be controlled from a long distance (e.g., within 3 m or the like) by a motion recognition command.

Meanwhile, each of the user terminal 100, the server 200, and the demonstrator terminal 300 may be implemented as a smartphone, a tablet PC, a laptop PC, a desktop PC, a smart TV, or the like.

The motion recognition-based interaction system according to the embodiment of the present disclosure may overcome such a limitation by providing a service to many people in a 1:N manner like Internet lectures, and analyze a training situation of the user through deep learning training to provide feedback, and thus the characteristics of 1:1 customized personal training may be utilized unlike unilateral broadcasting.

Figure 2:
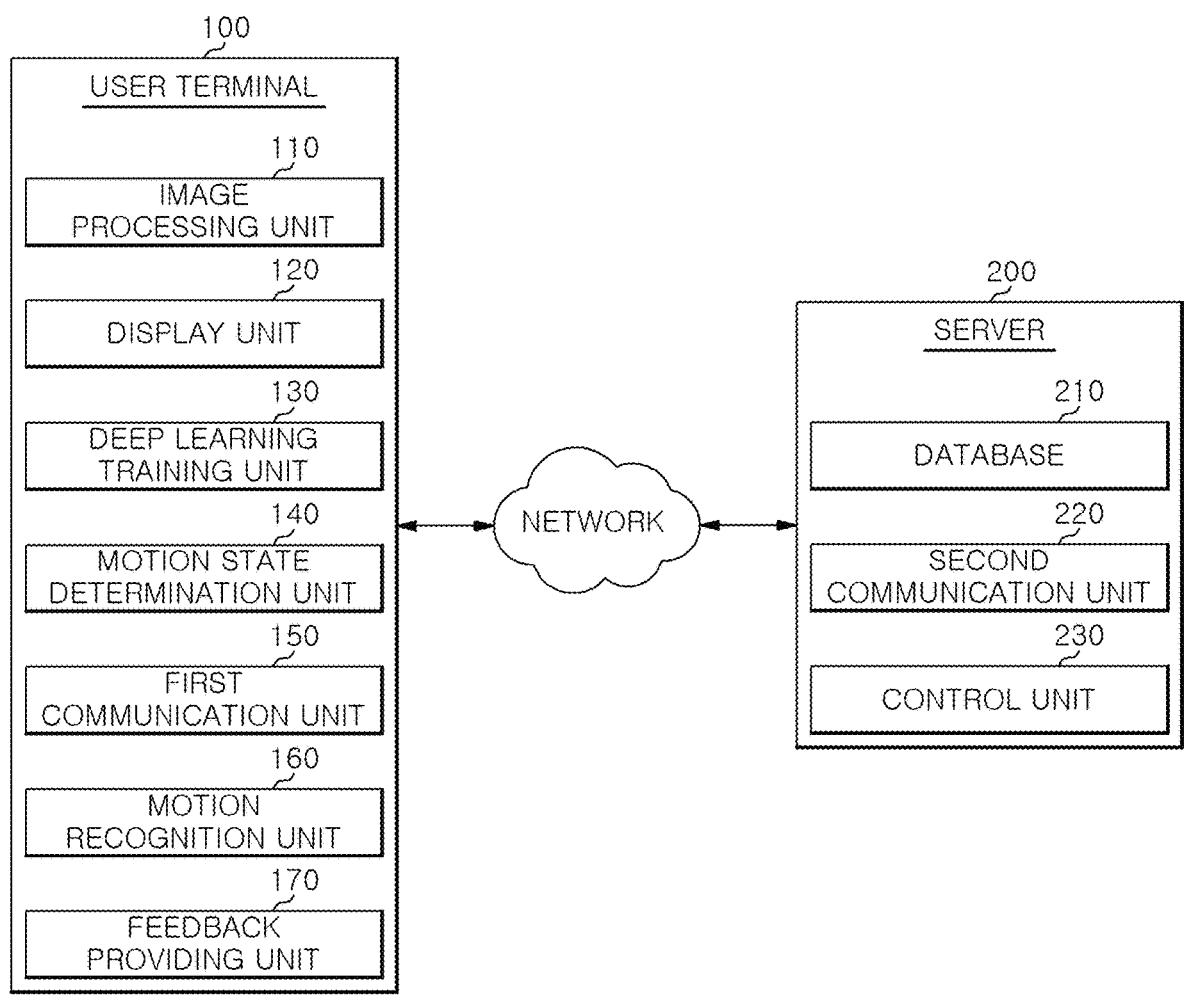
FIG. 2 is a block diagram illustrating a configuration of a motion recognition-based interaction system according to an embodiment of the present disclosure.

FIG. 2 is a block diagram illustrating a configuration of a motion recognition-based interaction system according to an embodiment of the present disclosure.

The motion recognition-based interaction system according to the embodiment of the present disclosure may recognize a motion and posture of a person using deep learning training techniques, and provide customized personal training between an individual student and a demonstrator online on the basis of the recognized motion and posture of the person.

In this case, the motion recognition-based interaction system may support remote individual motion training for various motion-based exercises. Here, various motion-based exercises may include taekwondo, golf, tennis, table tennis, yoga, Pilates, squash, baseball batting postures, various stretching motions, and the like.

Specifically, the user terminal 100 may execute an application for providing individual motion training, compare and analyze a second motion image of a user and a first motion image of a demonstrator, and determine whether the user actually performs an exercise or a specific motion and determine motion accuracy and the like.

To this end, the user terminal 100 may include an image processing unit 110, a display unit 120, a deep learning training unit 130, a motion state determination unit 140, a first communication unit 150, a motion recognition unit 160, and a feedback providing unit 170.

The image processing unit 110 may obtain an image of a user in real time. Specifically, the image processing unit 110 may capture and collect an image of a motion of the user using a built-in camera or webcam or connected to the user terminal 100. For example, the image processing unit 110 may photograph an exercise motion of the user.

The image processing unit 110 may receive an image of a demonstrator. Specifically, the image processing unit 110 may receive a lecture video of the demonstrator stored in a server 200 through the first communication unit 150. As the image of the motion of the demonstrator received by the image processing unit 110, a pre-stored image may be received or a real-time streaming video may be received.

The image processing unit 110 may display at least one of the image (second motion image) of the motion of the user and the image (first motion image) of the motion of the demonstrator on the display unit 120. In an embodiment, the image processing unit 110 may simultaneously display the image of the motion of the user and the image of the motion of the demonstrator on one screen. In this case, the user may easily follow the motion of the demonstrator by referring to the image of the motion of the demonstrator, and compare his/her own motion with the motion of the demonstrator.

When the server 200 transmits the first motion image to a plurality of user terminals 100, the server 200 may group the plurality of user terminals 100 into one or more groups and provide the first motion image thereto. In this case, the server 200 may receive image reception delay information received by each user terminal 100 and synchronize image synchronization in real time. Specifically, the server 200 may receive the image reception delay information received by each user terminal 100, and then apply a delay equal to a difference to the remaining terminals based on the slowest user terminal 100 to synchronize image synchronization of all the user terminals 100. In this case, the image processing unit 110 of the user terminal may compare images of other user terminals in real time as well as the first motion image and the second motion image, and compare its own motion with that of another user in real time.

Meanwhile, when the user terminal 100 is implemented as a portable device, the size of a screen of the display unit 120 is small, making it difficult for the user to determine the motion of the demonstrator. Therefore, in order to overcome the disadvantages and limitations of a portable device having a small screen, the user terminal 100 may use an external device (e.g., smart TV or the like) having a large screen as an extended viewer. To this end, the image processing unit 110 may use a web standard (HTML5)-based web socket technology to stream a video to an external device and synchronize play, and control video operations (e.g., start, stop, end, slow playback, fast playback, etc.). Alternatively, when there is no external device having a large screen, the image processing unit 110 may transmit the screen of the user terminal 100 to a TV or a monitor connected to a PC using mirroring technology.

The display unit 120 may display at least one of the image of the motion of the user and the image of the motion of the demonstrator.

The deep learning training unit 130 may identify the user's movement, motion, and posture from the image of the user through deep learning training, and extract data related thereto. Further, the deep learning training unit 130 may identify a reference movement, motion, and posture from the image of the demonstrator, and extract data related thereto.

Specifically, the deep learning training unit 130 may extract and process motion image from the images of the user and demonstrator using artificial intelligence such as big data-based deep learning, machine learning, and the like to digitize user and reference movements. Specifically, the deep learning training unit 130 may extract the reference movement from the first motion image and extract the user movement from the second motion image.

In an embodiment, the deep learning training unit 130 may extract a reference movement vector and a user movement vector using pose estimation technology. In this case, the deep learning training unit 130 may calculate a reference movement vector and a user movement vector corresponding to movements of the skeleton on the basis of specific body reference points of the user and the demonstrator. For example, the reference movement vector and the user movement vector corresponding to the movement of the skeleton may be calculated based on absolute coordinates and relative coordinates between the waist or pelvis and an individual skeleton.

The pose estimation technology is a technique in which a color or black and white image of a motion of a person is input and a two-dimensional (2D) key point that is position information about a body part of the person or a three-dimensional (3D) key point to which depth information is added is output. For example, in order to accurately predict information about a 2D key point, a degree of association between the body parts of the person in the image may be learned using part affinity fields (PAFs). A confidence map and a 2D vector (part affinity) indicating a degree of association between body parts are simultaneously predicted for each body part. In this case, a final 2D key point may be predicted using the confidence map and the 2D vector. The deep learning training unit 130 may calculate a reference movement vector and a user movement vector that can correspond to the 2D key point on the basis of the above algorithm.

Meanwhile, in addition to the pose estimation technology, various other techniques or algorithms may be applied to a training model for estimating the user and reference movements. Therefore, the deep learning training unit 130 may newly adopt a new technique or algorithm in which user and reference movement extraction results are improved, and upgrade a movement estimation method.

The deep learning training unit 130 may determine a unit motion performed by the user on the basis of relative coordinates of the user or continuous information of the user movement vector. Further, the deep learning training unit 130 may determine a unit motion performed by the demonstrator on the basis of relative coordinates of the demonstrator or continuous information of the reference movement vector.

Specifically, whether the user's or demonstrator's skeleton is continuously and repetitively moved may be determined through the extracted relative coordinates or movement vectors, and the types (e.g., push-up or squat, etc.) of unit motion may be classified to check the number of times the unit motion has been performed.

The deep learning training unit 130 may correct the user movement vector by comparing the relative coordinates of the demonstrator with the relative coordinates of the user. In this case, the motion state determination unit 140 may determine motion accuracy by comparing the corrected user movement vector with the reference movement vector. As a result, an error caused by a difference in physical size between the demonstrator and the user may be corrected and motion accuracy may be calculated, and thus the effect of motion correction may be increased.

Further, the deep learning training unit 130 may measure information about a motion state. Here, the information about the motion state may include a type of unit motion, a speed at which the unit motion is repeated, and the like. The measured information about the motion state may be used by the motion state determination unit 140 to evaluate the motion state of the user and further design the user's exercise quantity and exercise intensity.

The motion state determination unit 140 may compare user movement data with reference movement data, and determine whether the user actually performs an exercise or a specific motion, motion accuracy, and the like. For example, when the demonstrator instructs to repeat a specific unit motion a predetermined number of times in the lecture video of the demonstrator, the motion state determination unit 140 may determine whether the user has actually followed the instruction of the demonstrator.

In this case, the motion state determination unit 140 may determine motion accuracy by comparing the user movement vector corrected by the deep learning training unit 130 with the reference movement vector, and thus reliability of a result of the determination may be increased. Here, the motion accuracy is a measure representing a degree of matching between the user motion and the demonstrator motion. The motion accuracy may be set to at least one of a rate (%) of motion synchronization, an angle between skeletons, and a comparison value of the movement vectors of the user and demonstrator.

The motion accuracy may be determined in different ways depending on the characteristics of the motion. For example, in the case of golf or squash, a degree of matching of a swing speed or a swing angle may be determined as the motion accuracy, and in the case of a squat or yoga motion, the period of time or number of times the unit motion is maintained may be determined as the motion accuracy.

The motion state determination unit 140 may determine whether the determined motion accuracy deviates from a critical range. When it is determined that the motion accuracy deviates from the critical range, information about the skeleton performing the motion deviating from the critical range may be provided. In this case, the motion state determination unit 140 may display the information about the skeleton in the form of an image on the display unit 120 or output the information about the skeleton in the form of a warning sound, human voice, or the like.

The motion state determination unit 140 may compare the user movement data with the reference movement data, and assign a score by quantifying similarity on the basis of the motion accuracy or assign a score on the basis of expected calorie consumption to quantitatively evaluate the motion state.

In the operation of evaluating the motion state of the user by comparing the reference movement with the user movement, the motion state determination unit 140 may assign the score quantified according to similarity of the motion state of the user for each major joint and skeleton on the basis of the reference movement. For example, in performing the similarity evaluation, the motion state determination unit 140 may quantitatively obtain similarity between joint information about the person present in the reference movement and joint information of the user present in the user motion. Specifically, as the similarity, a Euclidean distance, a cosine distance, or the like may be used. For example, the quantitative similarity may be derived by obtaining the similarity for each joint and summing the obtained similarities by giving a weight according to the joint.

$$\text{Similarity} = \sum_{i=1}^{\infty} sim(P_{ref_i}, P_{user_i}) * w_i \quad \text{[Equation 1]}$$

Here, $Pref_i$ denotes the joint information about the reference movement, $Puser_i$ denotes the joint information about the user movement, and $w_i$ denotes the weight. For example, in order to obtain the similarity of a motion called squat, similarities between a reference squat motion and a squat motion of the user may be obtained, and as a result, the motion may be evaluated.

The motion state determination unit 140 may estimate the expected calorie consumption on the basis of weight information, exercise time, and motion accuracy-based similarity information that are collected about the user. The motion state determination unit 140 may estimate the expected calorie consumption using an index called metabolic equivalent of task (MET). The MET is energy consumption per unit body weight consumed per minute, and is expressed as kcal/min/kg. For example, 1 MET is the oxygen uptake at rest, which means 3.5 ml of oxygen per minute per 1 kg of body weight. Since energy production per 1 liter of oxygen is about 5 kcal, calories consumption may be obtained by calculating oxygen uptake according to activity with MET and then converting the calculated oxygen uptake into kcal units. In order for the motion state determination unit 140 to estimate the expected calorie consumption, body weight, exercise time, and weight information may be required. Personal information such as the user's height and body weight may be obtained by the user terminal 100. In order to improve the accuracy of the estimation of the expected calorie consumption, the motion state determination unit 140 may derive an expected calorie consumption estimation value by multiplying the quantitatively obtained similarity of the motion by a weight.

The motion state determination unit 140 may design a motion direction of the user on the basis of the quantitatively evaluated motion state. Specifically, the motion state determination unit 140 may set the user's exercise quantity and exercise intensity by comparing the motion accuracy according to the user movement or the number of times the unit motion has been performed with a preset user target amount. Here, the user target amount may be set by the motion state determination unit 140 or directly set by the user. Further, the user target amount may be set step by step according to the user's exercise level and exercise difficulty.

In this case, the motion state determination unit 140 may apply an artificial intelligence algorithm based on deep learning to set optimized exercise quantity and exercise intensity for each user.

The first communication unit 150 may perform wired or wireless communication with the server 200 through a wired or wireless network. In this case, the first communication unit 150 may transmit or receive at least one of the first motion image of the demonstrator, a training image, an image of the motion of the user, user movement data, data for motion accuracy, a designed exercise direction, a target exercise quantity, and exercise intensity.

The motion recognition unit 160 may recognize an input motion recognition command and control the user terminal 100 on the basis of the input motion recognition command. For example, the motion recognition unit 160 may control a display state of the image of the demonstrator, an application execution operation, and the like in response to the motion recognition command. Here, the motion recognition command may be directly input from the user through a separate optical device.

The motion recognition unit 160 may transmit preset message information when a specific motion of the user is recognized. For example, when the motion recognition unit 160 receives a predetermined preliminary motion of the user, the motion recognition unit 160 may be changed to a message transmission mode through motion recognition and may transmit a message matching the subsequent motion to the server 200. For example, the message may include a text message and an emoticon message, and is not limited to a specific embodiment. For example, when arms are crossed over the head in an X shape, an emoticon corresponding to "dislike" may be transmitted to the server 200. For example, when a specific motion is input, the motion recognition unit 160 may enter a filter change mode for the first motion image, and control a filter for modifying the illuminance, color, and the like of the first motion image.

The motion recognition unit 160 may terminate execution of an application when a specific motion of the user is recognized. When receiving a predetermined preliminary motion of the user, the motion recognition unit 160 may be changed to an application termination mode, and thereafter, when receiving a confirm operation, the motion recognition unit 160 may terminate the application.

The feedback providing unit 170 is a module that provides visual feedback to the user on the basis of the evaluation of the motion state. The feedback providing unit 170 may generate real-time feedback information on the basis of the second motion image obtained in real time. The feedback providing unit 170 may provide a visual effect that dynamically interacts with the user on the basis of a quantified evaluation result of the user motion. The feedback providing unit 170 may provide a visual effect that can track the user movement in the second motion image received by the image processing unit 110 in real time and indicate the motion state according to the scores for each major joint derived by the motion state determination unit 140.

The feedback providing unit 170 may provide a visual effect to enhance a more effective exercise effect on the basis of the quantified evaluation result of the user motion. Based on the quantified score derived from the motion state determination unit 140, a visual effect including the feedback information for increasing the exercise effect may be given to an important joint part to induce the user to focus on the corresponding part. Such visual effects are dynamically changed based on the obtained exercise evaluation score result. For example, the feedback providing unit 170 may provide feedback on the user's exercise performance, such as correct, excellent, incorrect, or the like, in the form of a character string on the basis of the quantified score, or may determine a degree of matching important joint parts and provide feedback using a visual icon such as an arrow or the like.

In consideration of an actual space where training is conducted, a constant distance should be secured between the user terminal 100 and the user. In this case, it may be inconvenient for the user to manipulate or touch the user terminal 100 or the display unit 120. In order to solve the above problem, the user terminal 100 includes the motion recognition unit 160 that recognizes and executes the motion recognition command of the user based on artificial intelligence.

Meanwhile, the server 200 may provide a lecture video of the demonstrator selected by the user to the user terminal 100, and provide a motion recognition-based interaction service online. To this end, the server 200 may include a database 210, a second communication unit 220, and a control unit 230.

The database 210 may store the lecture video of the demonstrator, various pieces of data for the user, and data related to the motion recognition-based interaction service. For example, the database 210 may manage the user movement data, and the data related to the motion accuracy, target exercise quantity, and exercise intensity that are transmitted by the user terminal 100.

The second communication unit 220 may perform wired or wireless communication with the user terminal 100 through a wired or wireless network. In this case, the second communication unit 220 may transmit or receive at least one of the first motion image of the demonstrator, the training image, the image of the motion of the user, the user movement data, and/or the data for the motion accuracy.

The control unit 230 may provide the motion recognition-based interaction service online. To this end, the control unit 230 may store and update the data in the database 210 or control the second communication unit 220. The control unit 230 may process a process corresponding to the user's or demonstrator's request.

Furthermore, the control unit 230 may manage biometric information, identification information, and the like of the user or demonstrator, and perform encryption work for user authentication and security on the basis of the biometric information, the identification information, and the like.

In this way, according to the present embodiment, a motion recognition-based interaction service for fitness training or motion-based exercise including individual courses in the form of 1:1 or group training may be provided. In this case, unlike general online lectures, a training effect of the user may be increased by providing feedback on an exercise achievement level to the user. Further, since it is possible to measure whether the user has actually executed an exercise, motion accuracy, and the number of exercises, which could not be implemented in existing online lectures, it is possible to provide customized opinions on exercise intensity and posture correction to the user.

Figure 3:
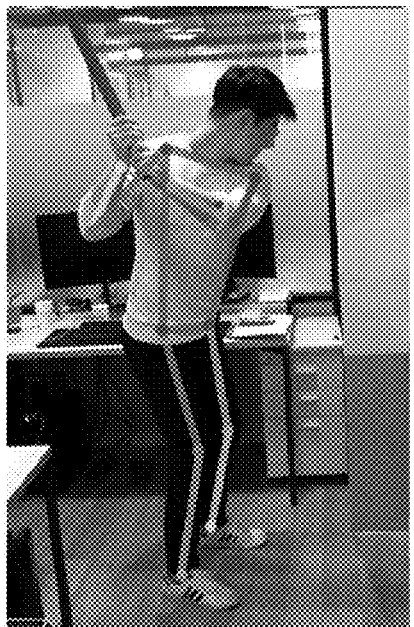
FIG. 3 shows a set of examples of a user image and a demonstrator image that are displayed when a motion recognition-based interaction service according to an embodiment of the present disclosure is provided.
Figure 3:
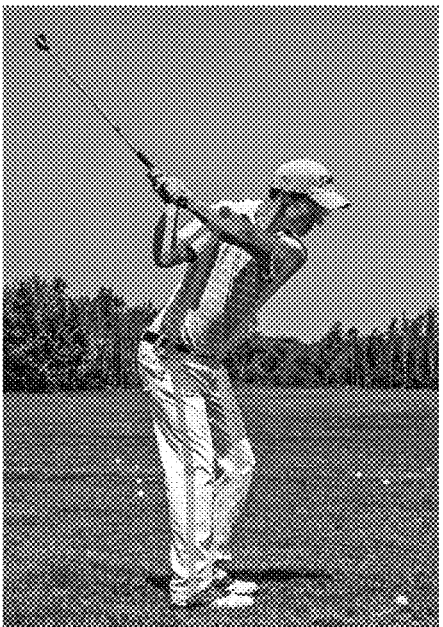

FIG. 3 shows a set of examples of a user image and a demonstrator image that are displayed side by side when a motion recognition-based interaction service according to an embodiment of the present disclosure is provided.

As shown in FIG. 3, in a user image I and a demonstrator image II, movement vectors are shown in different colors for each body part. In this case, the user may intuitively recognize a difference between his/her own motion and a demonstrator's motion by comparing the movement vectors of different colors.

Further, on each of the user image I and the demonstrator image II, the accuracy of a skeletal motion corresponding to each color may be displayed and identification marks indicating skeletons deviating from a critical range may be displayed.

Figure 4:
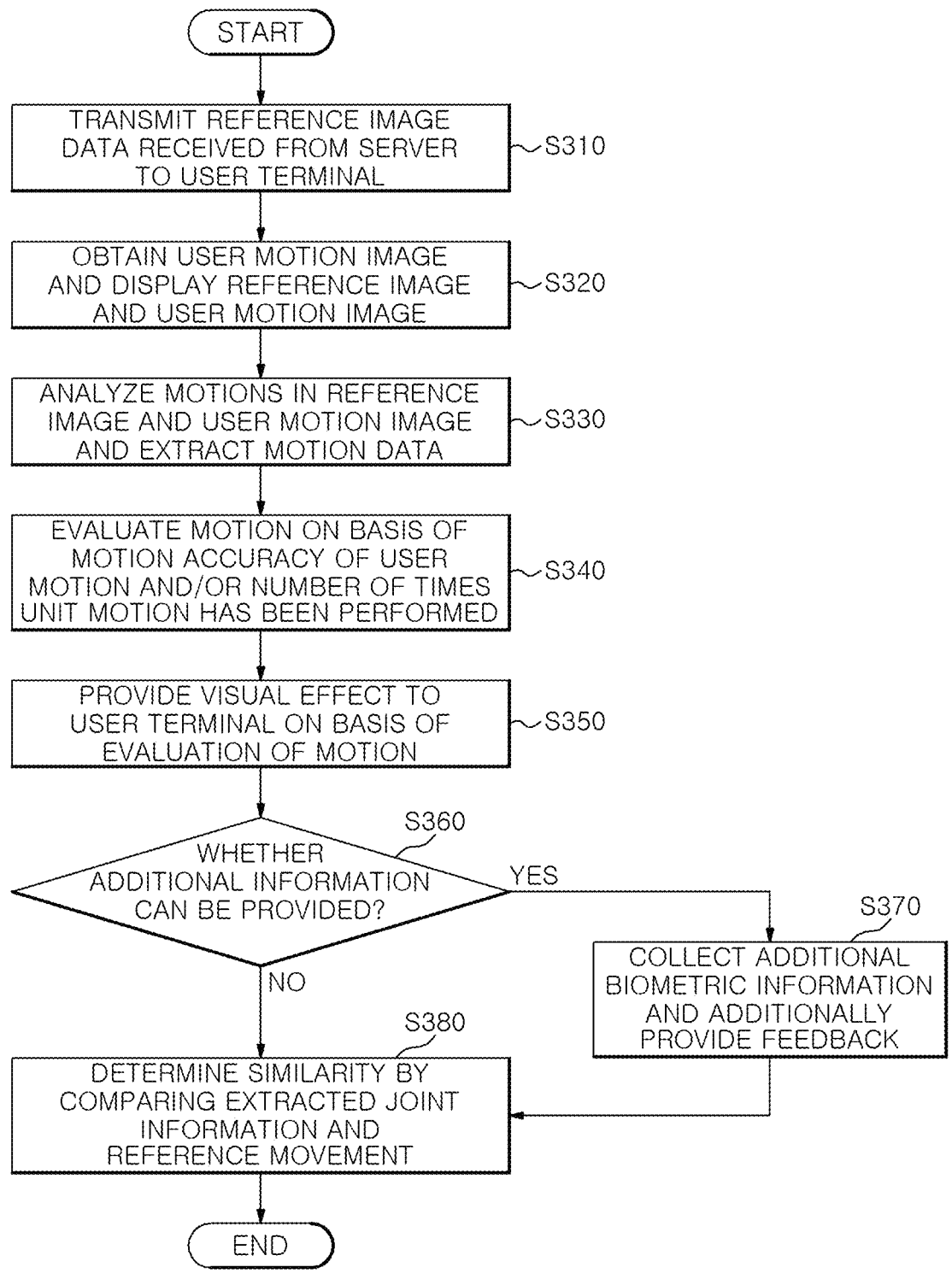
FIG. 4 is a flowchart illustrating a process for providing a motion recognition-based interaction service according to another embodiment of the present disclosure.
Figure 5A:
FIGS. 5A and 5B show a set of examples of user images that are displayed when the motion recognition-based interaction service according to another embodiment of the present disclosure is provided, where
Figure 5B:

FIG. 4 is a flowchart illustrating a process for providing a motion recognition-based interaction service according to another embodiment of the present disclosure. FIG. 5A and FIG. 5B show a set of examples of user images that are displayed when the motion recognition-based interaction service according to another embodiment of the present disclosure is provided.

According to the motion recognition-based interaction service according to another embodiment of the present disclosure, a user terminal 100 may compare and analyze an image of a user obtained by a corresponding user terminal 100 and reference movement data provided by a server 200, compare user movement data with the reference movement data, assign a score by quantifying similarity on the basis of motion accuracy or assign a score on the basis of expected calorie consumption, and quantitatively evaluate a motion state. Based on the quantitative evaluation, visual feedback that can indicate the motion state according to a derived score for each major joint may be provided.

In this case, a motion state determination unit 140 may compare the user movement data with the reference movement data to quantify the similarity on the basis of the motion accuracy, and a feedback providing unit 170 may provide the visual feedback to the user on the basis of the evaluation of the motion state.

Referring to FIG. 4, the reference image data received from the server is provided to the user terminal 100 (S310). When an application for providing the motion recognition-based interaction service is executed in the user terminal 100, the server 200 may transmit a demonstrator image that the user can refer to and demonstrator motion data extracted from the demonstrator image to the user terminal 100. In this case, the user may perform the exercise motion by referring to the demonstrator image displayed on the display unit 120.

A user motion image is obtained, and a reference image and the user motion image are displayed (S320).

An image processing unit 110 of the user terminal 100 may photograph the user motion and display the photographed user image together with the demonstrator image received from the server 200 on the display unit 120 simultaneously and in parallel. In this case, from the two images displayed simultaneously, the user may easily compare the poses or motions of himself/herself and the demonstrator.

The motions in the reference image and the user motion image are analyzed, and the motion data is extracted (S330).

Specifically, a deep learning training unit 130 may identify the motion and posture of the user from the user image on the basis of a deep learning training model, and extract the user movement data from the identified motion and posture of the user. Here, the user movement data may be a user movement vector.

In an embodiment, the user movement data may be extracted using a pose estimation algorithm. In this case, the user movement vector corresponding to a movement of a skeleton may be extracted based on absolute coordinates and relative coordinates between a specific body reference point of the user and an individual skeleton.

The motion is evaluated based on the motion accuracy of the user motion and/or the number of times a unit motion has been performed (S340).

Specifically, the deep learning training unit 130 may identify the unit motion performed by the user on the basis of the relative coordinates of the user or continuous information about the user movement vector, and compare the relative coordinates of the demonstrator with the relative coordinates of the user to correct the user movement vector. Thereafter, the motion state determination unit 140 may compare the corrected user movement vector with the reference movement vector to identify motion accuracy, and quantitatively evaluate the motion state of the user.

Based on the evaluation of the motion, the visual feedback is provided to the user terminal 100 (S350).

Specifically, the feedback providing unit 170 may provide the visual effect that can track a user movement in a second motion image received by the image processing unit 110 in real time and indicate the motion state according to the scores for each major joint derived by the motion state determination unit 140.

Whether additional information can be provided is determined (S360).

In this specification, the provided additional information may include individual healthcare information for providing a personalized service to the user. To this end, the additional information received from a sensor of a wearable device worn by the user or a sensor of the user terminal 100 may be used for feedback.

When it is determined that the additional information can be provided (S360—Yes), feedback is additionally provided by collecting additional biometric information (S370) and the process proceeds to a similarity determination operation.

Based on the additional biometric information received from an externally located wearable device, the user terminal 100 may provide personalized exercise recommendations and exercise plans. For example, the motion state determination unit 140 may derive the number of times per minute for each exercise by analyzing motion/movement log data of the user. Thereafter, the feedback providing unit 170 may visualize a change in exercise performance to provide the change to the user as feedback.

When it is determined that the additional information cannot be provided (S360—No), the similarity is determined by comparing extracted joint information and reference movement (S380).

Figure 6:
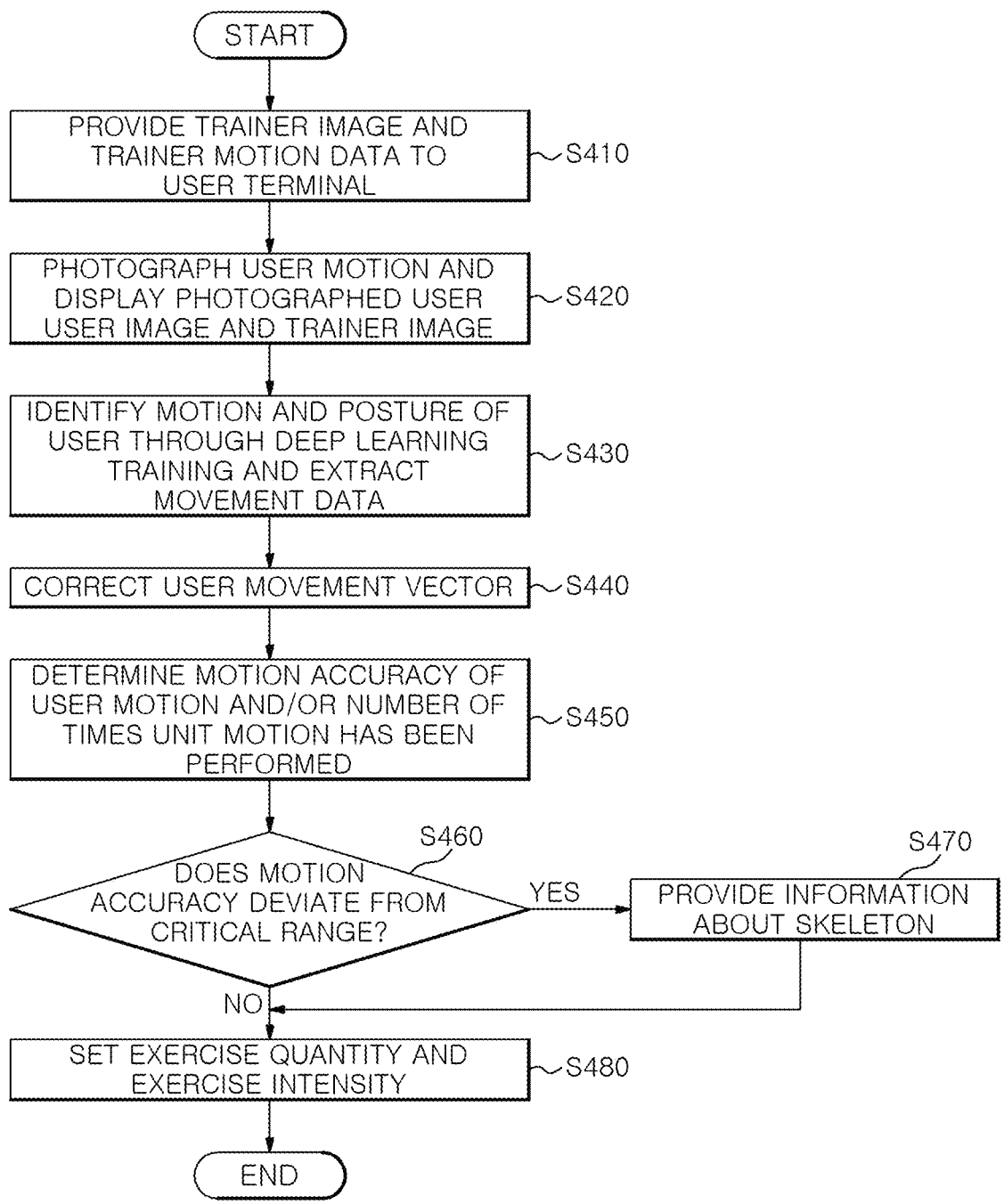
FIG. 6 is a flowchart illustrating a process for providing a motion recognition-based interaction service according to still another embodiment of the present disclosure.

FIG. 6 is a flowchart illustrating a process for providing a motion recognition-based interaction service according to still another embodiment of the present disclosure. According to the motion recognition-based interaction service according to still another embodiment of the present disclosure, a user terminal 100 may compare and analyze an image of a user obtained by a corresponding user terminal 100 and reference movement data provided by a server 200, and determine whether the user actually performs an exercise or a specific motion to determine motion accuracy and the like. In this case, unlike the embodiment illustrated in FIG. 2, instead of the user terminal 100, the server 200 may extract the reference movement data from an image of a demonstrator. To this end, the server 200 may include a deep learning training unit 130.

In this case, the deep learning training unit 130 may identify a reference movement, motion, and posture from the image of the demonstrator through deep learning training, and extract data for the reference movement, motion, and posture. The extracted data may be provided to the user terminal 100 to be compared with user movement data.

As illustrated in FIG. 6, the demonstrator image and demonstrator motion data are provided to the user terminal 100 (S410).

A user motion is photographed, and the photographed user image and the demonstrator image are displayed (S420).

Through deep learning training, the motion and posture of the user are identified, and the user movement data is extracted (S430).

A user movement vector is corrected (S440).

In order to correct an error caused by a difference in physical size with the demonstrator, the deep learning training unit 130 may correct the user movement vector by comparing relative coordinates of the demonstrator with relative coordinates of the user.

Motion accuracy of the user motion and the number of times a unit motion has been performed are determined (S450).

The motion state determination unit 140 may compare the corrected user movement vector with a demonstrator movement vector to determine the motion accuracy of the user motion. In the case in which the user motion is a unit motion that is repeatedly performed, the number of times the unit motion has been performed may be determined. The motion accuracy and the number of times the unit motion has been performed are results of the user's actual exercise, and may be used as information for providing feedback on the exercise result to the user.

When it is determined that the motion accuracy deviates from the critical range (S460—Yes), information about a skeleton is provided (S470).

Specifically, the motion state determination unit 140 may provide the information about the skeleton performing the motion deviating from the critical range.

Further, the motion state determination unit 140 may determine whether the number of times the unit motion has been performed by the user satisfies a preset allowable number of times or range, and output a result of the determination in the form of an image or audio.

When it is determined that the motion accuracy does not deviate from the critical range (S460—No), exercise quantity and exercise intensity are set (S480).

Specifically, when the determination and analysis of the motion state of the user are completed, the motion state determination unit 140 may compare the motion accuracy according to the user movement and the number of times the unit motion has been performed with target amounts, and set an exercise direction, exercise quantity, and exercise intensity of the user.

Figure 7:
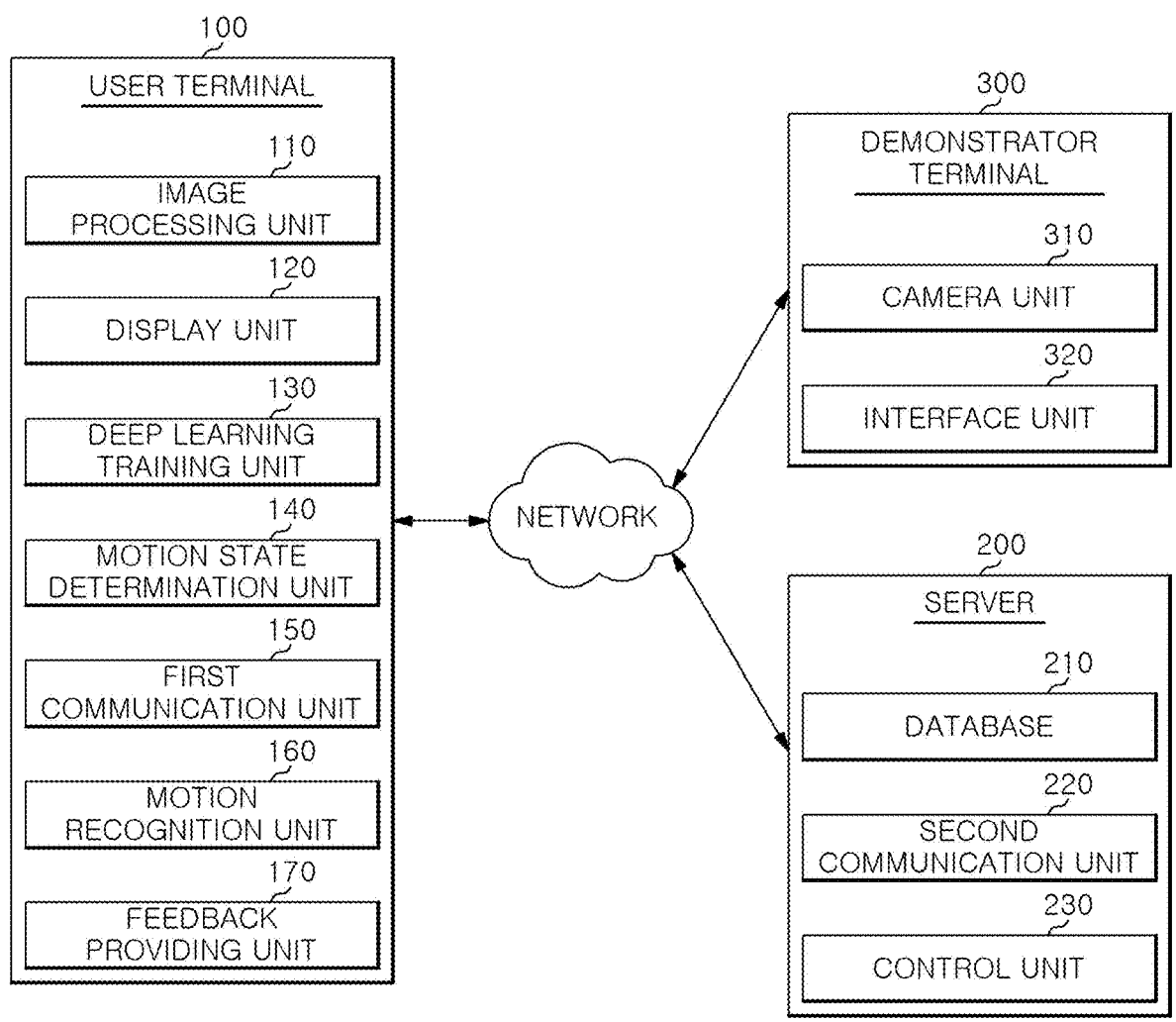
FIG. 7 is a block diagram illustrating a configuration of a motion recognition-based interaction system according to yet another embodiment of the present disclosure.

FIG. 7 is a block diagram illustrating a configuration of a motion recognition-based interaction system according to yet another embodiment of the present disclosure.

According to the motion recognition-based interaction system according to yet another embodiment of the present disclosure, a user terminal 100 may compare and analyze an image of a user and an image of a demonstrator that is provided by a demonstrator terminal 300 or reference movement data, and determine whether the user actually performs an exercise or a specific motion to determine motion accuracy and the like. In this case, unlike the embodiment illustrated in FIG. 2, instead of the user terminal 100 and the server 200, the demonstrator terminal 300 may provide the image of the demonstrator or the reference movement data.

Meanwhile, except for these differences, the operations of the user terminal 100 or the server 200 is basically the same as those described in FIG. 2. Therefore, in the following descriptions, only the differences will be described except for overlapping descriptions.

An image processing unit 110 of the user terminal 100 may receive at least one of the image of the demonstrator and/or the reference movement data. Specifically, the image processing unit 110 may receive a demonstrator lecture video stored in the demonstrator terminal 300 through a first communication unit 150, or may stream a video captured by a camera unit 310 in real time. Further, the image processing unit 110 may receive the reference movement data extracted from the image of the demonstrator from the demonstrator terminal 300.

The first communication unit 150 may perform wired or wireless communication with the demonstrator terminal 300 and the server 200 through a wired or wireless network. In this case, the first communication unit 150 may transmit or receive at least one of a first motion image of the demonstrator, a training image, an image of the motion of the user, user movement data, data for motion accuracy, a designed exercise direction, target exercise quantity, and exercise intensity.

Further, the first communication unit 150 may transmit the user movement data, data for the motion accuracy, the target exercise quantity, and the exercise intensity to a matched demonstrator terminal 300, and receive feedback thereon from the demonstrator terminal 300.

When the demonstrator video is streamed in real time, the control unit 230 of the server 200 may control a conversation timeline between the user and the demonstrator by driving a chatting module or a social networking service (SNS) module for an interface between the user and the demonstrator.

The demonstrator terminal 300 may produce and provide a demonstrator lecture video selected by the user to the user terminal 100, and provide feedback in response to the motion state of the user received from the user terminal 100. To this end, the demonstrator terminal 300 may include a camera unit 310 and an interface unit 320.

The camera unit 310 may capture the motion of the demonstrator in real time to produce the demonstrator image.

The interface unit 310 may transmit the produced demonstrator image to the user terminal 100 or stream the captured video in real time.

Further, when the interface unit 310 receives information about the motion state of the user from the user terminal 100, the interface unit 310 may transmit feedback thereon.

In this way, according to the present embodiment, the demonstrator video may be streamed on the user terminal 100 in real time, and feedback on the exercise result may be received from the demonstrator.

Figure 8:
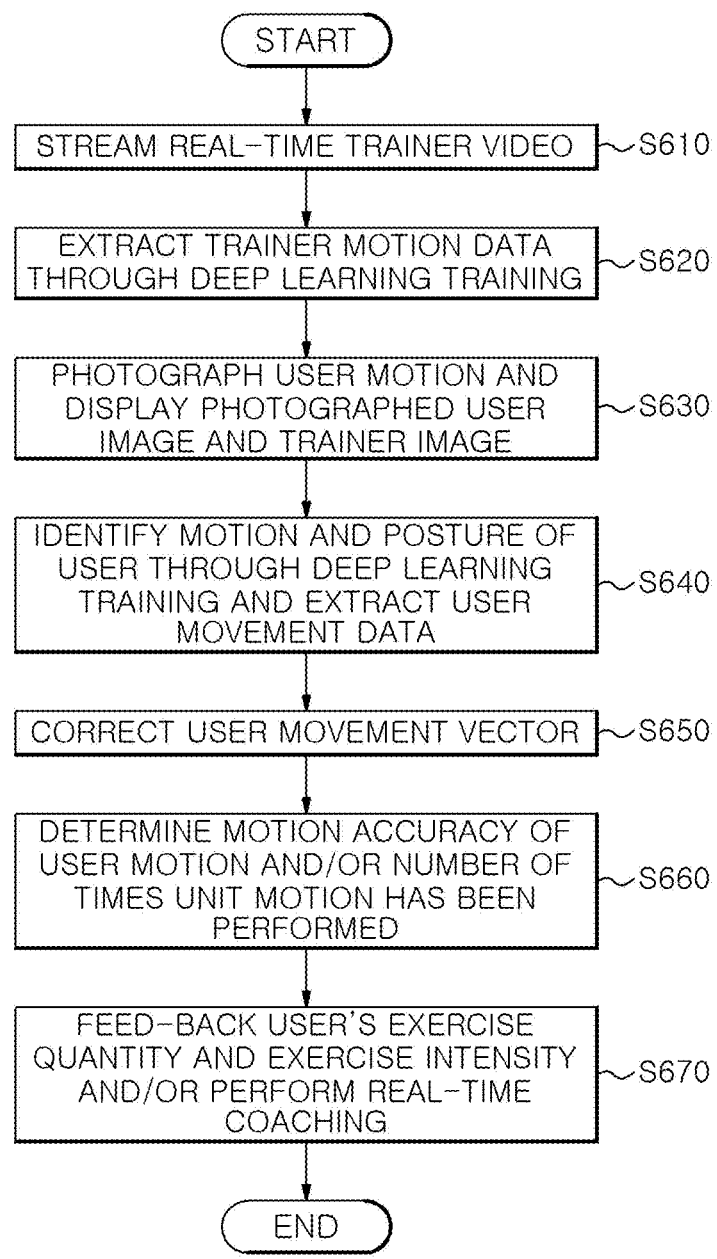
FIG. 8 is a flowchart illustrating a process for providing a motion recognition-based interaction service according to yet another embodiment of the present disclosure.

FIG. 8 is a flowchart illustrating a process for providing a motion recognition-based interaction service according to yet another embodiment of the present disclosure.

Specifically, FIG. 8 illustrates a process for providing the motion recognition-based interaction service provided by the system illustrated in FIG. 7. Meanwhile, among the operations illustrated in FIG. 8, descriptions of operations overlapping those of FIG. 4 will be omitted below.

As illustrated in FIG. 8, a real-time demonstrator video is streamed (S610).

The user terminal 100 may stream a video of the demonstrator from the demonstrator terminal 300 in real time. Alternatively, a demonstrator lecture video stored in the demonstrator terminal 300 may be received.

Demonstrator motion data is extracted through deep learning training (S620).

The deep learning training unit 130 of the user terminal 100 may identify the reference movement, motion, and posture from the image of the demonstrator through deep learning training, and extract data related thereto.

A user motion is photographed, and the photographed user image and the demonstrator image are displayed (S630).

The motion and posture of the user may be identified through deep learning training, and user movement data is extracted (S640).

A user movement vector is corrected (S650).

Motion accuracy of the user motion and the number of times a unit motion has been performed may be determined (S660).

In this case, information about the user's exercise quantity and exercise situation, including the identified motion accuracy and number of times the unit motion has been performed, may be transmitted to the demonstrator terminal 300.

The user's exercise quantity and exercise intensity are fed back, and real-time coaching is performed (S670).

When the determination and analysis of the motion state of the user are completed, the demonstrator terminal 300 may compare the motion accuracy according to the user movement and the number of times the unit motion has been performed with a target amount, and set an exercise direction, exercise quantity, and exercise intensity of the user. In this case, the user may be coached in real time by the information and feedback related thereto being transmitted to the user terminal 100.

As described above, the motion recognition-based interaction service according to the present disclosure may accurately digitize an online user's training situation remotely on the basis of the pose estimation technology, and may set or adjust the user's exercise quantity and exercise intensity using the digitized online user's training situation. Further, by providing the motion accuracy between the motion of the user and the motion of the demonstrator, the comparison and correction with the demonstrator motion may be enabled.

Further, since a processing load may occur when deep learning and machine learning are performed using big data, a process with such a large load may be executed in the server 200 having a large processing capacity, and the user terminal 100 may display a result of the processing of the server 200 and provide the result of the processing to the user.

Meanwhile, the above-described methods may be written as a program that can be executed on a computer, and may be implemented in a general-purpose digital computer that runs the program using a computer-readable medium. Further, the structure of the data used in the above-described method may be recorded on a computer readable medium through one of various methods. It should be understood that a recording medium that records computer-executable programs or code for performing various methods of the present disclosure does not include temporary objects such as carrier waves or signals. The computer-readable medium may include a storage medium such as a magnetic storage medium (e.g., a read only memory (ROM), floppy disk, hard disk, etc.) or an optical readable medium (e.g., a compact disc read only memory (CD-ROM), a digital video disc (DVD), etc.).

While the present disclosure has been particularly described with reference to the embodiments, the embodiments are only exemplary embodiments of the present disclosure and the present disclosure is not intended to be limited thereto. It will be understood by those skilled in the art that modifications and applications in other forms may be made without departing from the spirit and scope of the present disclosure. For example, each component specifically shown in the embodiments may be modified and implemented. In addition, it should be understood that differences related to these modifications and applications are within the scope of the present disclosure as defined in the appended claims.

What is claimed is:

1. A motion recognition-based interaction method, comprising:
 providing a first motion image as a reference to a user terminal;
 obtaining a second motion image of a motion of a user from the user terminal;
 extracting a reference movement from the first motion image, extracting a user movement from the second motion image;
 correcting a movement vector of a subject of the reference movement by comparing relative coordinates of the subject of the reference movement with relative coordinates of a subject of the user movement so that an error caused by a difference in physical size between the subject of the reference movement and the subject of the user movement is corrected;
 determining motion accuracy by comparing the corrected movement vector of the subject of the reference movement with a movement vector of the subject of the user movement;
 evaluating a motion state of the user by comparing the reference movement with the user movement;
 providing feedback to the user based on the evaluation of the motion state, wherein the feedback includes visual feedback,
 wherein a plurality of users are grouped into one or more groups and the providing the first motion image further comprises providing the first motion image to the one or more groups;
 receiving image reception delay information of the second motion image received by a plurality of user terminals;
 applying a delay to remaining user terminals based on the user terminal having slowest image synchronization and synchronizing image synchronization; and
 comparing motion images of the plurality of users belonging to the one or more groups with other users' second motion images.

2. The motion recognition-based interaction method of claim 1, wherein the providing of the first motion image to the user terminal further includes providing a pre-stored image or providing a real-time streaming video.

3. The motion recognition-based interaction method of claim 1, wherein the evaluating of the motion state of the user further includes performing the evaluation of the motion state of the user by deep learning training techniques.

4. The motion recognition-based interaction method of claim 3, wherein the performing the evaluation of the motion state of the user by the deep learning training techniques further includes performing the evaluation by pose estimation technology, and
 the method further comprising calculating each of the reference movement and the user movement to correspond to relative coordinates between a specific body reference point of each of a subject of the reference movement or the subject of the user movement and an individual skeleton and to a movement of the individual skeleton with respect to the relative coordinates.

5. The motion recognition-based interaction method of claim 4, wherein the evaluating of the motion state of the user by comparing the reference movement with the user movement includes assigning a score quantified according to similarity of the motion state of the user for each major joint based on the reference movement, and
 the providing of the feedback to the user includes providing a visual effect that is allowed to track the user movement in the second motion image in real time and indicate the motion state according to the score for each major joint.

6. The motion recognition-based interaction method of claim 1, wherein the motion state of the user relates to motion accuracy indicating a degree of matching between the reference movement and the user movement.

7. The motion recognition-based interaction method of claim 6, further comprising, when the motion accuracy deviates from a critical range, providing information about a skeleton performing the motion deviating from the critical range.

8. The motion recognition-based interaction method of claim 6, wherein the evaluating of the motion state of the user further includes assigning a score by quantifying similarity based on the motion accuracy, or assigning a score based on expected calorie consumption.

9. The motion recognition-based interaction method of claim 8, further comprising estimating the expected calorie consumption based on weight information, exercise time, and motion accuracy-based similarity information that are collected about the user.

10. The motion recognition-based interaction method of claim 1, further comprising, when an application for providing a motion recognition-based interaction service is executed in the user terminal, causing the user terminal to switch a control method of the application to a motion recognition-based control method.

11. The motion recognition-based interaction method of claim 10, wherein, when a specific motion of the user is recognized, preset message information is transmitted.

12. The motion recognition-based interaction method of claim 10, wherein, when a specific motion of the user is recognized, the execution of the application is terminated.

13. The motion recognition-based interaction method of claim 1, wherein the providing of the feedback to the user includes generating real-time feedback information based on the second motion image obtained in real time and transmitting the generated real-time feedback information to the user terminal.

14. The motion recognition-based interaction method of claim 1, wherein the providing of the feedback to the user includes providing a visual effect that dynamically interacts with the user based on quantified user motion evaluation results.

15. A non-transitory computer-readable recording medium, comprising executable instructions that, when executed by a processing system including a processor, facilitate the method of claim 1.

* * * * *